United States Patent
Tsuda et al.

[11] Patent Number: 6,068,675
[45] Date of Patent: May 30, 2000

[54] BONNET AND ENGINE ROOM OF A VEHICLE

[75] Inventors: Toshio Tsuda; Hiroyasu Nagata, both of Amagasaki, Japan

[73] Assignee: Kanzaki Kokyukoki Mfg. Co., Ltd., Hyogo-Ken, Japan

[21] Appl. No.: 09/148,071

[22] Filed: Sep. 4, 1998

[30] Foreign Application Priority Data

Sep. 5, 1997 [JP] Japan ................................. 9-241358

[51] Int. Cl.⁷ .................................................. B01D 50/00
[52] U.S. Cl. ................... 55/385.3; 55/385.1; 123/198 E; 180/84
[58] Field of Search .............................. 55/385.3, 385.1, 55/487, 505, 507; 123/41.49, 198 E; 180/68.1, 84

[56] References Cited

U.S. PATENT DOCUMENTS

| | | | |
|---|---|---|---|
| 2,886,016 | 5/1959 | Ashton | 55/385.3 |
| 2,896,594 | 7/1959 | Ashton | 55/385.3 |
| 3,630,003 | 12/1971 | Ashton | 55/385.3 |
| 3,941,034 | 3/1976 | Helwig et al. | 55/385.3 |
| 4,233,040 | 11/1980 | Vogelaar et al. | 55/385.3 |
| 4,443,236 | 4/1984 | Peiler | 55/385.3 |
| 4,542,785 | 9/1985 | Bagnall et al. | 55/385.3 |
| 4,689,060 | 8/1987 | Koske | 55/385.3 |
| 5,840,091 | 11/1998 | Strong | 55/385.1 |
| 5,901,672 | 5/1999 | Suzuki et al. | 123/41.49 |
| 5,944,603 | 8/1999 | Guinn et al. | 55/385.3 |

FOREIGN PATENT DOCUMENTS

| | | | |
|---|---|---|---|
| 0313763 | 5/1989 | European Pat. Off. | 55/385.3 |
| 2055719 | 3/1981 | United Kingdom | 55/385.3 |

*Primary Examiner*—David A. Simmons
*Assistant Examiner*—Minh-Chau T. Pham
*Attorney, Agent, or Firm*—Sterne, Kessler, Goldstein & Fox P.L.L.C.

[57] ABSTRACT

A blocking plate 16 and sealing members 17 and 18 are disposed in bonnet 1 around the outer surface of a radiator 11 so as to form an intake space 1a and an exhaust space 1b both in the front and the rear of radiator 11. Recessed portion 4a extending across intake space 1a and exhaust space 1b is disposed at side panel 4 and is covered with second dust-proof net 7. Opening 4b is opened at recessed portion 4a adjacent to intake space 1a.

2 Claims, 5 Drawing Sheets

BONNET AND ENGINE ROOM OF A VEHICLE

BACKGROUND OF THE INVENTION

1. Field of the Invention

The present invention is related to an improved structure for introducing the open air into the engine room of a vehicle.

2. Related Art

A conventional construction juxtaposes a radiator, a cooling fan, an engine in order in a bonnet of a tractor and supplies the air from a front grille to the engine through the radiator and the cooling fan. Also, such construction may have the grille, covered with a dustproof net, at the side surface of the bonnet. In the above mentioned construction, an air cleaner is disposed in front of the radiator so as to take the unheated air before passing through the radiator.

In the conventional construction, the dustproof net must have as small meshes as possible in order to prevent dust from entering into the bonnet, however, small meshes reduce the air taken from a dustproof net. The grille must therefore cover a large area so as not to reduce the air taken in the bonnet and to keep dust away from the inner of a bonnet. Then the grille must be extended to the side of the bonnet. However, the grille cannot extend beyond the cooling fan so as to prevent the air from flowing to the engine. If the grille is disposed in the rear of the cooling fan, it will interrupt the course of the air because the air will also be introduced from the rear of the cooling fan. As mentioned above, in the conventional construction it is difficult to introduce sufficient volume of air while preventing dust from entering into the grille because of the limitation of the space for disposing the dustproof net.

Also when the air cleaner is disposed in front of the radiator, the bonnet tends to be too long to make a compact vehicle. It is desired that the air cleaner be disposed at the exhaust space on the engine and the air supplied into the air cleaner before being heated by the radiator.

SUMMARY OF THE INVENTION

A bonnet and engine room is provided which can prevent dust from entering therein and improve the intake of the air and the cooling of the engine. A radiator and an engine are disposed in the engine room for supplying the air from a first dustproof net to the engine through the radiator. A partition is disposed in the engine room in order to form an intake space and an exhaust space both in the front and in the rear of radiator, respectively. A second dustproof net extending across the intake space and the exhaust space is disposed at the side surface of the bonnet so as to form an intake passage between the side surface of the bonnet and the second dustproof net. The opening communicating the passage with the intake space is positioned at the side surface of the bonnet.

An air cleaner is disposed in the exhaust space so that a suction port of the air cleaner passes through the partition and is open in the intake space.

DETAILED DESCRIPTION OF THE PREFERRED EMBODIMENTS

Figure 1:
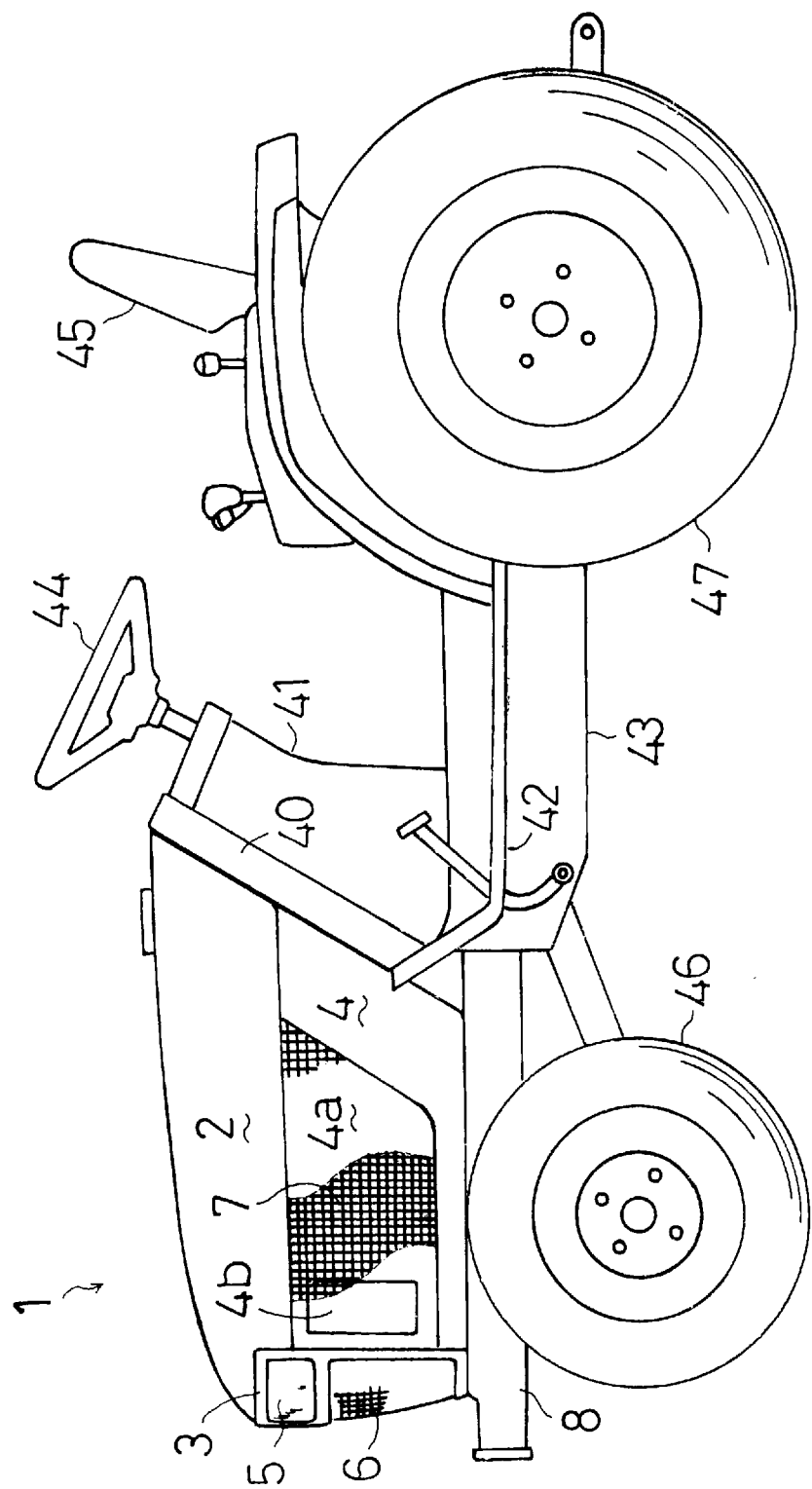
FIG. 1 is a side view of a vehicle of the present invention.

The whole construction of a tractor of the present invention will now be described with particular reference to FIG. 1. Left and right parallel longitudinal engine frames 8 are extended forward from a body frame 43 including a clutch system, a transmission and the like. Left and right front wheels 46 are supported below each of the engine frames 8. Also, left and right rear wheels 47 are supported on the left and right sides of a transmission disposed on the rear end of body frame 43.

Approximate horizontal steps 42 are provided respectively on the left and right sides of body frame 43. On the rear portion of body frame 43 is disposed a seat 45 and on the front portion of body frame 43 is vertically mounted a dashboard 41 on which a steering wheel 44 is provided. A rearward slant dashboard frame 40 having an arch-like shape is vertically mounted on engine frames 8 so as to extend from the front ends of steps 42 and is also provided on the front end of dashboard 41.

On engine frames 8, a bonnet 1 for containing engine 13 and the like consists of an engine hood 2, a front panel 3 and side panels 4. The left and right sides of engine 13 are covered with side panels 4. The front of engine 13 is covered with front panel 3. The top of engine 13 is covered with engine hood 2.

Lateral headlights 5 are attached at the upper portion of front panel 3. The lower portion of front panel 3 is formed into a grille covered with a first dustproof net 6. A longitudinal recessed portion 4a covered with a second dustproof net 7 is formed on each of side panels 4. A grille 4b is open at the front half recessed portion 4a. An assembly of bonnet 1 of the invention will be described with particular reference to FIGS. 1 through 5. An approximately horizontal bottom plate 9 having longitudinal stairs is disposed between engine frames 8. A radiator 11 is erected on the rear upper stair of bottom plate 9. A pair of left and right support frames 21 are vertically mounted in front of radiator 11. A lateral horizontal support member 22 is spanned between the front ends of support frames 21. Both side portions of support member 22 in front of respective support frames 21 are approximately forward horizontally bent to form segments 22. An engaging pin 22a (see FIG. 5) projects upward from an upper surface of each segment 22. A hole for insertion of projections 3b provided on the lower end of front panel 3 (see FIGS. 4 and 5) is formed on the front lower stair of bottom plate 9. Attachment of front panel 3 is completed by insertion of engaging pin 22a into a hole of a segment 3a extending rearward from the upper portion of front panel 3 and by insertion of projection 3b of front panel 3 into a hole of the front lower stair of bottom plate 9.

Figure 2:
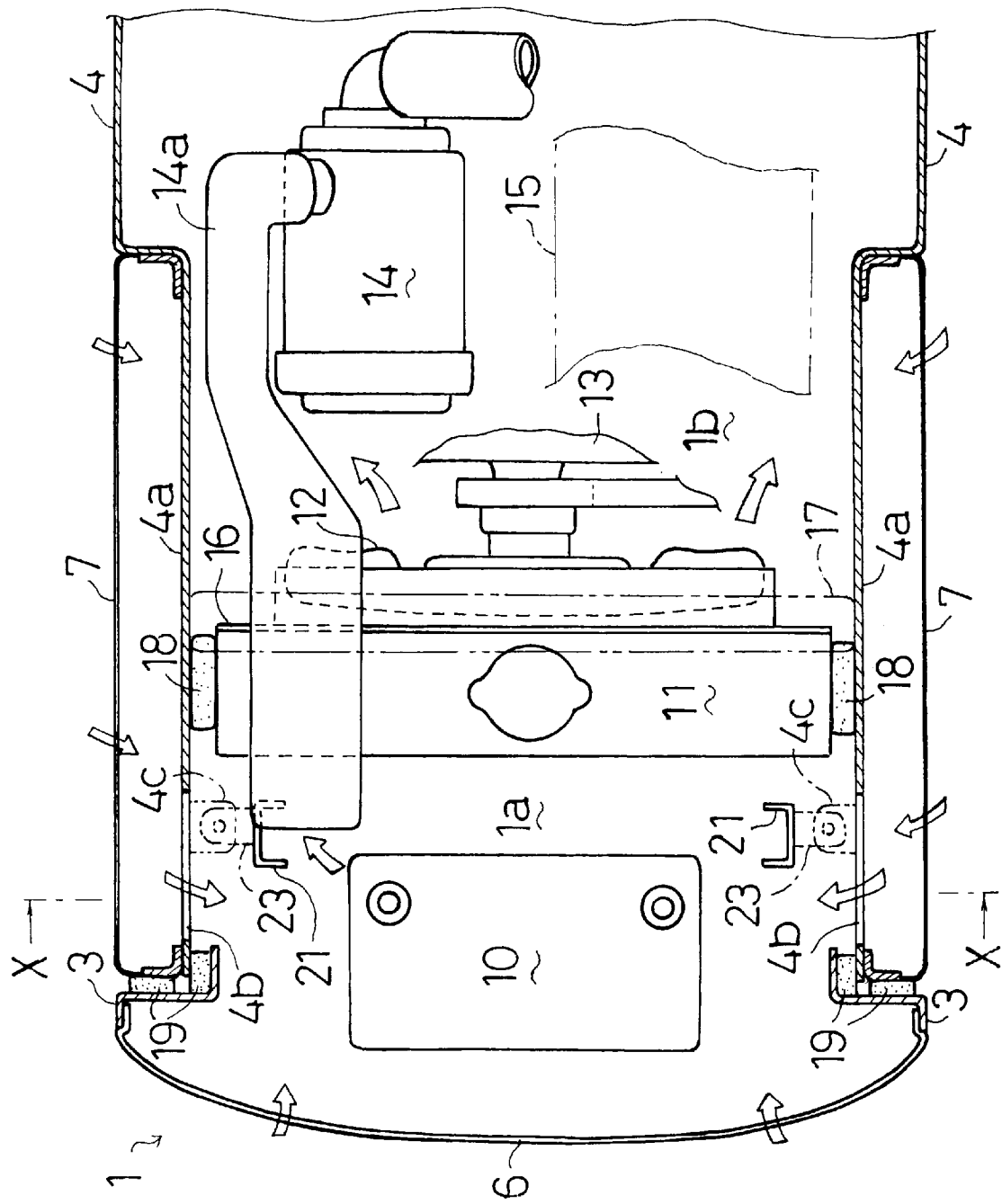
FIG. 2 is a plan view of an inside of a bonnet.
Figure 3:
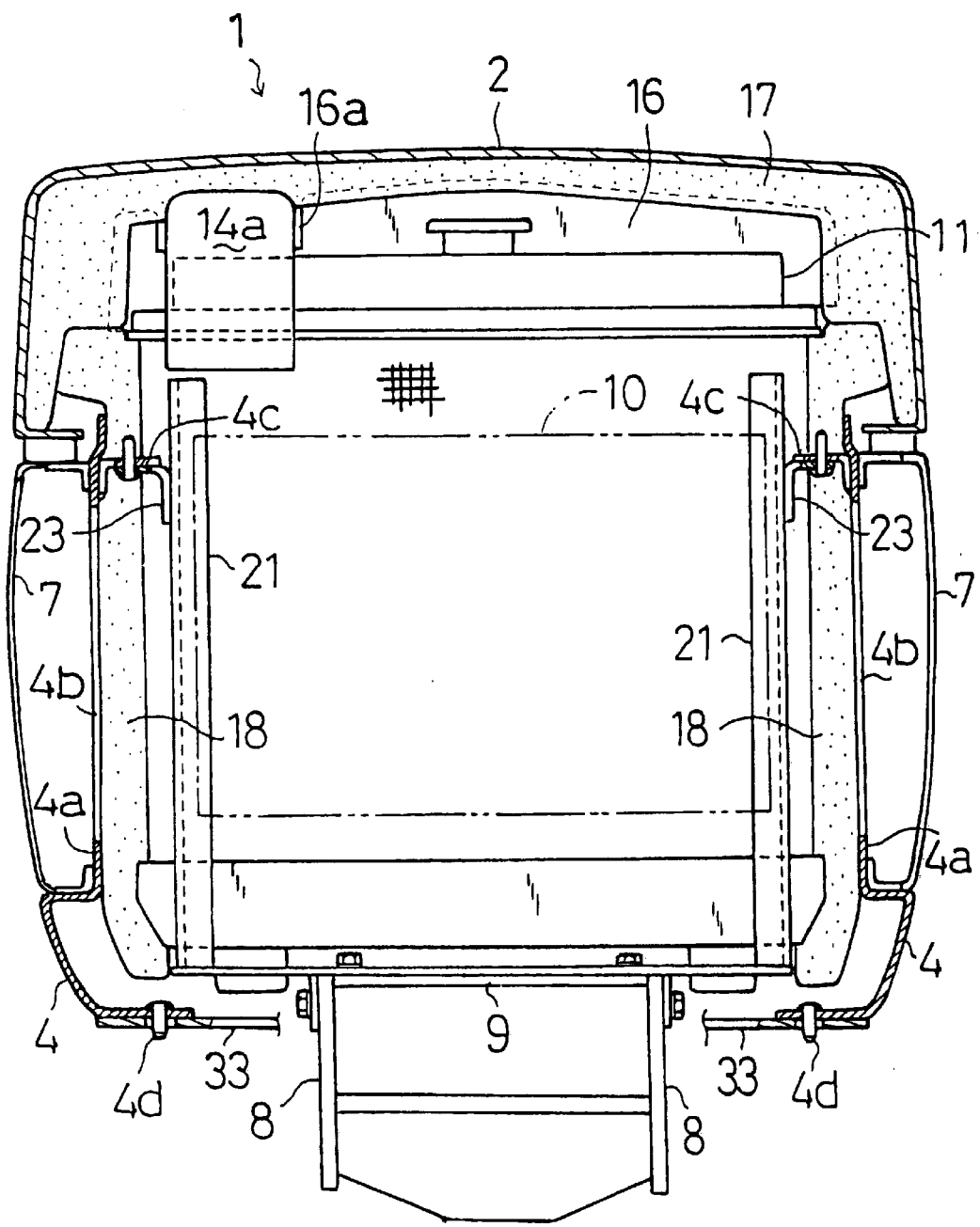
FIG. 3 is a sectional view in the direction of the arrows X—X in FIG. 2.

Segments are provided respectively on a pair of front and rear portions on the upper end of each side panel 4. FIG. 2 shows only front segments 4c of the front and rear segments. An engaging pin 4d projects downward from one point of the lower end of side panel 4. A first segment 23, a second segment 33 and a third segment 34 extend approximate horizontally from the outer side surface of each of left and right support frames 21, the outer side surface of each of the left and right engine frames 5 and each of left and right portions of a dashboard frame 40, respectively. An engaging pin projects from an upper portion of each of first and third segments 23 and 34. A hole is bored in second segment 33.

Both engaging pins of first segment 23 and third segment 34 go through both front segments 4c and rear segments (not shown) of side panel 4 respectively, furthermore engaging pin 4d on the lower end of side panel 4 is inserted into a hole of second segment 33 for furnishing side panel 4.

Engine hood 2, having a hinge 38 pivotally supported by a hinge stay 39 projecting from the front end of dashboard frame 40, is vertically rotatable on the horizontal axis of a pivotal shaft 39a. For locking closed engine hood 2, a close-locking mechanism is provided on support frame 21. Also, an open-locking mechanism for locking opened engine hood 2 consists of both a guide stay 35 and a stand bar 36 positioned on the rear upper portion of an engine 13 to be discussed below.

The close-locking mechanism will be described with respect to FIGS. 4 and 5. As explained above, a guide member 24 projects upward from each of support frames 21 standing on bottom plate 9. A locking member 25 fixed on each lateral side of the front portion of engine hood 2 slides down along each guide member 24 in the descent of the front end of engine hood 2 for closing engine hood 2. An upward biased spring 26 projects upward from the rear portion of engaging pin 22a on each of the segments of support member 22. An abutting member 25a projecting downward from locking member 25 abuts against spring 26 in closing engine hood 2. Compression of springs 26 absorb shocks when closing engine hood 2.

A locking pin 25b is laterally fixed on the lower rear portion of abutting member 25. Hook members 28 are integrally attached to the vicinity of lateral ends of a rotatable shaft 27 spanned between left and right segments of support member 22f or longitudinal rotation of hook members 28 by rotation of shaft 27. A spring stay extends rearward from the vicinity of one end of shaft 27. A spring 30 is stretched to a spring stay 21a projecting from frame 21. Hook members 28 are biased clockwise by spring 30. As explained above, locking member 25 slides down on guide member 24 in the descent of the front end of engine hood 2. Locking pin 25b abuts against a cam provided on the free end portion of hook member 28 and pushes hook member 28 forward against the biasing of spring 30. Once locking pin 25b is fitted into the recessed portion of hook member 28, hook member 28 is rotated rearwardly by biasing of spring 30 and placed on the first position. Locking closed engine hood 2 is completed by these processes.

Next, explanation will be given to a releasing mechanism for locked closed engine hood 2. A rotating arm 29 extends frontward from the vicinity of lateral center of shaft 27. The front end of a lock releasing lever 31 is pivotally supported by the front end of rotating arm 29. The rear end of lock releasing lever 31 extends below front panel 3 through a lever guide 32 fixed on a front lower stair 9a of bottom plate 9 and bends between lateral engine frames 8 for forming a grip lever. Once an operator inserts his hand into the lower portion of front panel 3 and pushes down lock release lever 31, the front end of arm 29 is rotated downward and hook member 28 is integrally rotated frontward so that locking pin 25b slips off and locked engine hood 2 is released. When an operator lifts up the front end of engine hood 2 in this condition, engine hood 2 is opened upward on pivotal shaft 39a of hinge 38 as a fulcrum.

Once engine hood 2 is opened, the lower end of a stand bar 36 hung pivotally from engine hood 2 rotates upward in a guide groove 35a of guide stay 35 fixed on a hot air blocking plate 20 provided at the rear end portion of an engine room and enters into a locking groove 35b provided at the upper end of guide groove 35a. Such a construction of open-locking mechanism keeps engine hood 2 opened.

Explanation will be given on an arrangement of each part disposed in bonnet 1. A battery 10 is mounted on front lower stair 9a of bottom plate 9. Radiator 11 stands on rear upper stair 9b of bottom plate 9. A cooling fan 12 supplying cooling air to the rear portion of a vehicle is disposed at the rear portion of radiator 11. Engine 13 is supported on left and right engine frames 8 so as not to vibrate. An air cleaner 14 and a muffler 15 are juxtaposed on both lateral sides of the upper portion of engine 13.

A blocking plate 16 is fixed between radiator 11 and cooling fan 12. A sealing member 17 made of urethane, rubber or the like is attached on the upper and both side inner surfaces of engine hood 2 so as to fill up space thereof when closing engine hood 2. Also, sealing members 18 are attached respectively on both lateral surfaces of radiator 11 so as to abut each sealing member 18 against the inner surface of each side panel 4 when side panels 4 are closed. Radiator 11, blocking plate 16, sealing member 17 and sealing members 18 define a partition dividing the bonnet between the front chamber and the rear chamber. A space in front of cooling fan 12 is defined as an intake space 1a, and a space behind cooling fan 12 is defined as an exhaust space 1b.

Upper, front, rear, lateral and lower ends of intake space 1a are respectively enclosed with engine hood 2, front pane 13, radiator 11, blocking plate 16 and both sealing members 17 and 18, side panel 4 and bottom plate 9. A sealing member 19 is attached between the front end of side pane 14 and the rear end of front pane 13 for filling up space between them. The air is taken from only first dustproof net 6 and grilles 4b into intake space 1a by operation of cooling fan 12. Second dustproof net 7 cleanses the air taken from grille 4b. Making each dustproof net 6 and 7 with small meshes keeps dust away from intake space 1a extremely.

Each grille 4b is open at each side of intake space 1a. Recessed portion 4a longitudinally extends across both intake space 1a and exhaust space 1b. Recessed portion 4a is covered with second dustproof net 7. An intake passage covering a larger area than that of grille 4b is formed between second dustproof net 7 and recessed portion 4a. The air, following arrows shown in FIG. 2, is taken in intake space 1a from grille 4b through an intake passage between second dustproof net 7 and recessed portion 4a. Therefore, a larger area of the intake passage increases the air taken in intake space 1a while dustproof net 7 with small meshes keeps dust away from intake space 1a.

Next, the inner construction of exhaust space 1b will be described.

Exhaust space 1b is enclosed with engine hood 2 on the upper portion thereof, with side panels 4 on the lateral side thereof, with radiator 11, blocking plate 16 and sealing members 17 and 18 on the front end thereof and with hot air blocking plate 20 on the rear end thereof. Bottom plate 9 extends rearward so as to reach radiator 11, whereby exhaust space 1b behind radiator 11 is open at the bottom thereof. The air is supplied to exhaust space 1b though intake space 1a, radiator 11, cooling fan 12 to cool engine 13, air cleaner 14 and muffler 15 and is exhausted from a bottom opening behind radiator 11. An exhaust port 12a of cooling fan 12 is shown in FIG. 5.

As explained above, the air, following the arrows shown in FIG. 2, is supplied from intake space 1a to exhaust space 1b through radiator 11 and cooling fan 12.

Engine 13, muffler 15 and air cleaner 14 are disposed in exhaust space 1b. Air cleaner 14 has an intake pipe 14a extending to the front of radiator 11 through a partition between recessed portion 16a formed on blocking plate 16 and sealing member 17. An intake port of Pipe 14a is disposed at the front of radiator 11 so not to take heated air passed through radiator 11. Air cleaner 14 is disposed on conventional unused space above engine 13 so as to reduce the length of bonnet 1 and to make the vehicle more compact. Also, such construction includes a means for taking the air from the front of radiator 11.

Figure 4:
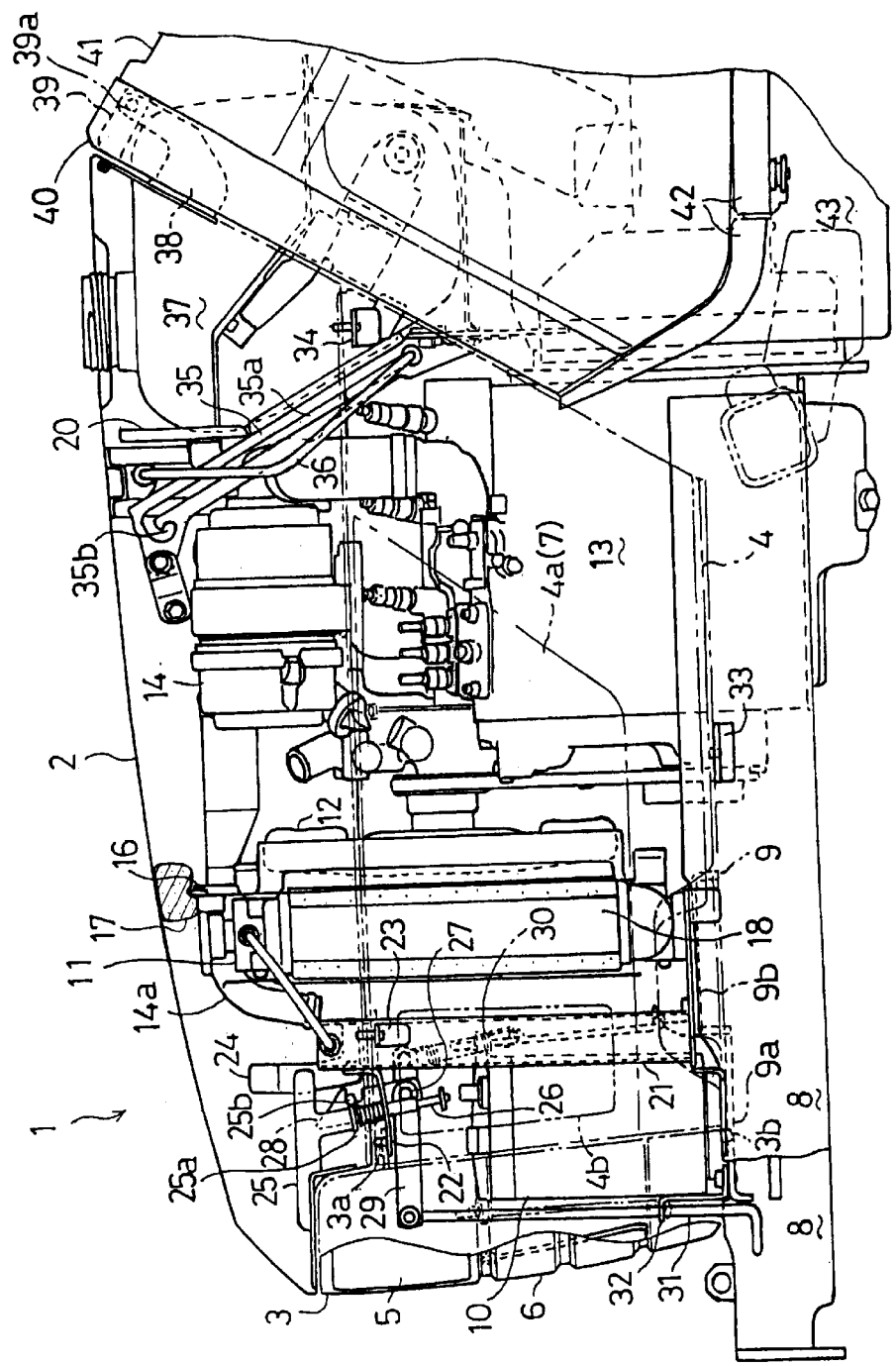
FIG. 4 is an inner side view of a bonnet.
Figure 5:
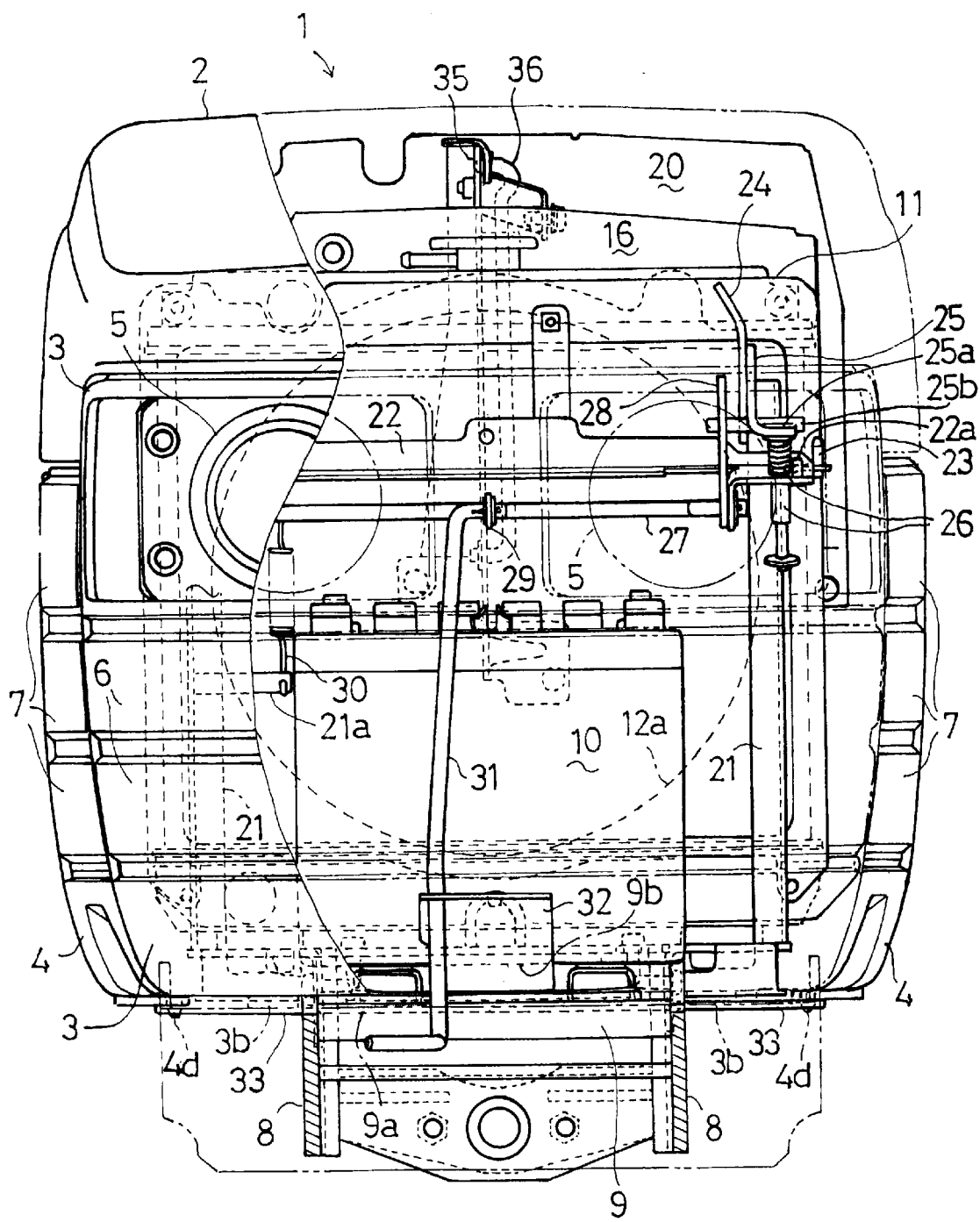
FIG. 5 is an inner front view of the same centering a close-locking mechanism thereon.

A fuel tank 37, as shown in FIG. 4, is disposed at the rear space of hot air blocking plate 20. The heated air in exhaust space 1b is blocked by plate 20 and does not contact with fuel tank 37.

The present invention, constructed as mentioned above, has the following effect. The radiator and the engine are disposed in the engine room to exhaust the air taken from the first dustproof net covering the front surface of the bonnet and passed through the radiator. A partition is provided in order to form the intake space and the exhaust space in front and in rear of the radiator. The second dustproof net, extending across the intake space and the exhaust space, is disposed at the side of the bonnet. An intake passage is formed between the side of the bonnet and the second dustproof net. An opening for communicating the intake passage and the intake space is provided on the side of the bonnet. The partition divides the engine room into the intake space and the exhaust space to absolutely supply the air in the intake space to the exhaust space via the radiator. Such construction allows the air to effectively cool the engine in the exhaust space. In the above-said construction, the air is cleansed by the dustproof net having small meshes and enough is taken to improve the intake of the air and cooling of the engine through the passage covering a large area and extending across the intake space and the exhaust space. The intake passage extends across the intake space and the exhaust space, however, the opening of the side panel is communicated with the intake space only so that the air cannot be taken into the exhaust space and cannot interrupt the flow of cooling air.

Furthermore, in the above mentioned construction, The air cleaner is disposed in the exhaust space. The intake port of the air cleaner is positioned in the intake space through the partition. The air cleaner, taking the unheated air from the front of the radiator, is disposed at the conventional dead space on the engine. Such construction allows the vehicle to be more compact by reducing the length of the bonnet in comparison to the conventional construction having the air cleaner in front of the radiator.

What is claimed is:

1. A bonnet and engine room comprising;
   a first dustproof net provided at a front surface of said bonnet;
   a radiator and an engine disposed in said bonnet so as to send air taken in from said first dustproof net to said engine through said radiator;
   a partition formed in said bonnet so as to divide an interior of said bonnet between an intake space before said radiator and a rear exhaust space behind said radiator;
   a second dustproof net extending across said intake space and said exhaust space, thereby forming an intake passage between a side surface of said bonnet and said second dustproof net; and
   an opening in said side surface of the bonnet for communicating said intake passage with said intake space.

2. A bonnet and engine room as set forth in claim 1, further comprising an air cleaner disposed in said exhaust space, wherein an intake port of said air cleaner is positioned in said intake space through said partition.

\* \* \* \* \*